United States Patent
Kaplan et al.

(10) Patent No.: US 6,733,411 B1
(45) Date of Patent: May 11, 2004

(54) ELECTRONICALLY CONTROLLED HYDRAULIC ACTUATOR FOR LIMITED SLIP DIFFERENTIAL ASSEMBLY

(75) Inventors: Martin Kaplan, Avon, CT (US); John A. Grogg, LaOtto, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/059,314

(22) Filed: Jan. 31, 2002

(51) Int. Cl.[7] .............................................. F16H 48/22
(52) U.S. Cl. ........................ 475/88; 475/150; 475/231; 192/103 F
(58) Field of Search ..................... 475/88, 150, 231, 475/249; 192/103 F, 35

(56) References Cited

U.S. PATENT DOCUMENTS

| | | |
|---|---|---|
| 4,837,556 A | 6/1989 | Matsushita et al. |
| 5,297,994 A | 3/1994 | Suzuki et al. |
| 5,322,484 A | 6/1994 | Reuter |
| 5,747,894 A | 5/1998 | Hirai et al. |
| 5,949,155 A | 9/1999 | Tamura et al. |
| 6,005,304 A | 12/1999 | Seelig |
| 6,056,658 A * | 5/2000 | Illmeier .................. 475/88 |
| 6,075,433 A | 6/2000 | Ono et al. |
| 6,169,339 B1 | 1/2001 | Cripe |
| 6,440,027 B1 * | 8/2002 | Hofer et al. .............. 475/88 |
| 2001/0027905 A1 * | 10/2001 | Taureg ..................... 192/35 |

* cited by examiner

Primary Examiner—Rodney H. Bonck
Assistant Examiner—Dennis Abdelnour
(74) Attorney, Agent, or Firm—Liniak, Berenato & White

(57) ABSTRACT

A differential assembly for a motor vehicle comprises a differential case rotatably supported in an axle housing, opposite output shafts drivingly connected to the differential case, a friction clutch assembly for selectively engaging and disengaging the differential case and the output shaft, and a hydraulic clutch actuator for selectively frictionally loading the clutch assembly. The hydraulic clutch actuator includes a variable pressure relief valve controlled by a solenoid actuator for selectively engaging the friction clutch assembly. In order to provide the solenoid actuator with an electrical power and/or control signals in a contactless manner, the differential assembly is further provided with a transformer assembly including a primary transformer unit non-rotatably mounted to the axle housing and connected to a source of electrical energy, and a rotatable secondary transformer unit secured to an outer peripheral surface of the differential case.

18 Claims, 3 Drawing Sheets

ELECTRONICALLY CONTROLLED HYDRAULIC ACTUATOR FOR LIMITED SLIP DIFFERENTIAL ASSEMBLY

BACKGROUND OF THE INVENTION

1. Field of the Invention

The present invention relates to limited slip differential assemblies for motor vehicles, and more particularly to a limited slip differential assembly having an electronically controlled hydraulic actuator for limiting a relative rotational speed between two driven shafts above a predetermined amount.

2. Description of the Prior Art

Conventionally, differentials well known in the prior art, are arranged in a power transmission system of a motor vehicle to allow a pair of output shafts operatively coupled to an input shaft to rotate at different speeds, thereby allowing the wheel associated with each output shaft to maintain traction with the road while the vehicle is turning. Such a device essentially distributes the torque provided by the input shaft between the output shafts. However, these types of differentials known in the art as an open differentials, i.e. a differential without clutches or springs, are unsuitable in slippery conditions where one wheel experiences a much lower coefficient of friction than the other wheel; for instance, when one wheel of a vehicle is located on a patch of ice or mud and the other wheel is on dry pavement. In such a condition, the wheel experiencing the lower coefficient of friction loses traction and a small amount of torque to that wheel will cause a "spin out" of that wheel. Since the maximum amount of torque, which can be developed on the wheel with traction, is equal to torque on the wheel without traction, i.e. the slipping wheel, the engine is unable to develop any torque and the wheel with traction is unable to rotate. Thus, the necessity for a differential, which limits the differential rotation between the output shafts to provide traction on slippery surfaces, is well known.

Such differential assemblies are typically called limited slip differentials. Conventionally, they use a frictional clutch between the side gear and the differential case. The frictional clutch may be selectively actuated by various hydraulic actuator assemblies, which are constructed of elements disposed inside the differential casing. The hydraulic actuator assemblies internal to the differential case often include displacement pumps disposed inside the differential casing and actuated in response to a relative rotation between the differential case and the output shaft. The displacement pumps are usually in the form of internal gear pumps, such as gerotor pumps adapted to convert rotational work to hydraulic work. In the internal gear pumps, an inner gear having outwardly directed teeth cooperates with an external gear having inwardly directed teeth so that fluid chambers therebetween increase and decrease in volume as the inner and outer gears rotate in a housing. By connecting the inlet and outlet of the device to the proper location along the sides of the gear set, the variable displacement chambers receive and discharge hydraulic fluid so that the device can function as a pump or motor. A shaft or other mechanical device can be connected to either the inner or outer gear depending upon the type of device. The hydraulic actuator assemblies further include a hydraulic piston member for frictionally loading the friction clutch.

Recent advances in vehicle control may require the disabling of the limited slip feature of the differential at moderate to high speeds. One such system is the yaw stability control, which uses the vehicle's brakes to correct the trajectory of the vehicle during a turn. The impulse braking of the yaw stability control feature generates a speed difference between the wheels on either side of the vehicle. The limited slip feature will engage due to this speed difference and may interfere with the performance of the yaw stability control feature. There is therefore a need to disable the limited slip feature of the hydraulic limited slip differential during specified conditions to ensure proper performance of the devices like yaw stability control while also allowing the limited slip feature to be enabled at other specified conditions where traction may be needed and where yaw control is not essential. There is a problem with current hydraulically actuated limited slip differentials in that they do not have a simple on/off capability which is separate and distinct from the hydraulic pressure supply/control circuit actuating the clutch assemblies.

It is the intent of this invention to overcome these shortcomings by providing an external control of the hydraulic pressure generated within a hydraulically actuated limited slip differential in which the limited slip clutch can either be turned on or off, or set at any intermediate condition by controlling the maximum system hydraulic pressure limit.

SUMMARY OF THE INVENTION

The present invention provides an improved electronically controlled differential assembly providing both limited slip and open differential capabilities.

The differential assembly in accordance with the preferred embodiment of the present invention includes a rotatable differential case rotatably supported within an axle housing and forming housing a differential gearing rotatably supported in the case and a pair of opposite output axle shafts in meshing engagement with the differential gearing to permit differential rotation thereof. The differential assembly includes a friction disk clutch assembly disposed within the differential case and provided to selectively lock the differential assembly. The friction clutch assembly includes a number of alternating outer friction plates non-rotatably coupled to the differential case and inner friction plates drivingly coupled to one of the output axle shafts. The differential assembly further includes a hydraulic clutch actuator for selectively frictionally loading the clutch assembly. The hydraulic clutch actuator comprises a hydraulic pump for generating a hydraulic pressure, a piston assembly disposed within the differential case between the pump and the clutch pack and defining a pressure chamber, and a variable pressure relief valve assembly to selectively control said limited slip assembly. The variable pressure relief valve assembly has a pressure relief valve and a solenoid actuator for selectively setting a maximum hydraulic pressure attainable within the pressure chamber between a maximum release pressure and a minimum release pressure.

In order to provide the solenoid actuator with an electrical power and/or control signals in a contactless manner, the differential assembly is further provided with a transformer assembly including a stationary primary transformer unit mounted to the axle housing and connected to a source of electrical energy, and a rotatable secondary transformer unit secured to an outer peripheral surface of the differential case. The secondary transformer unit is responsive to a magnetic field generated by the primary transformer unit to induce the electrical current to the secondary transformer unit for supplying the electrical current to the solenoid actuator. Preferably, the primary transformer unit includes a substantially annular primary coil wound about a primary core and connected to a source of electrical energy. The primary core is secured to the interior surface of the axle housing. Similarly, the secondary transformer unit includes a substantially annular secondary coil wound about a secondary core and positioned adjacent to the primary coil. The secondary core is secured to an outer peripheral surface of the differential case.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

Figure 1:
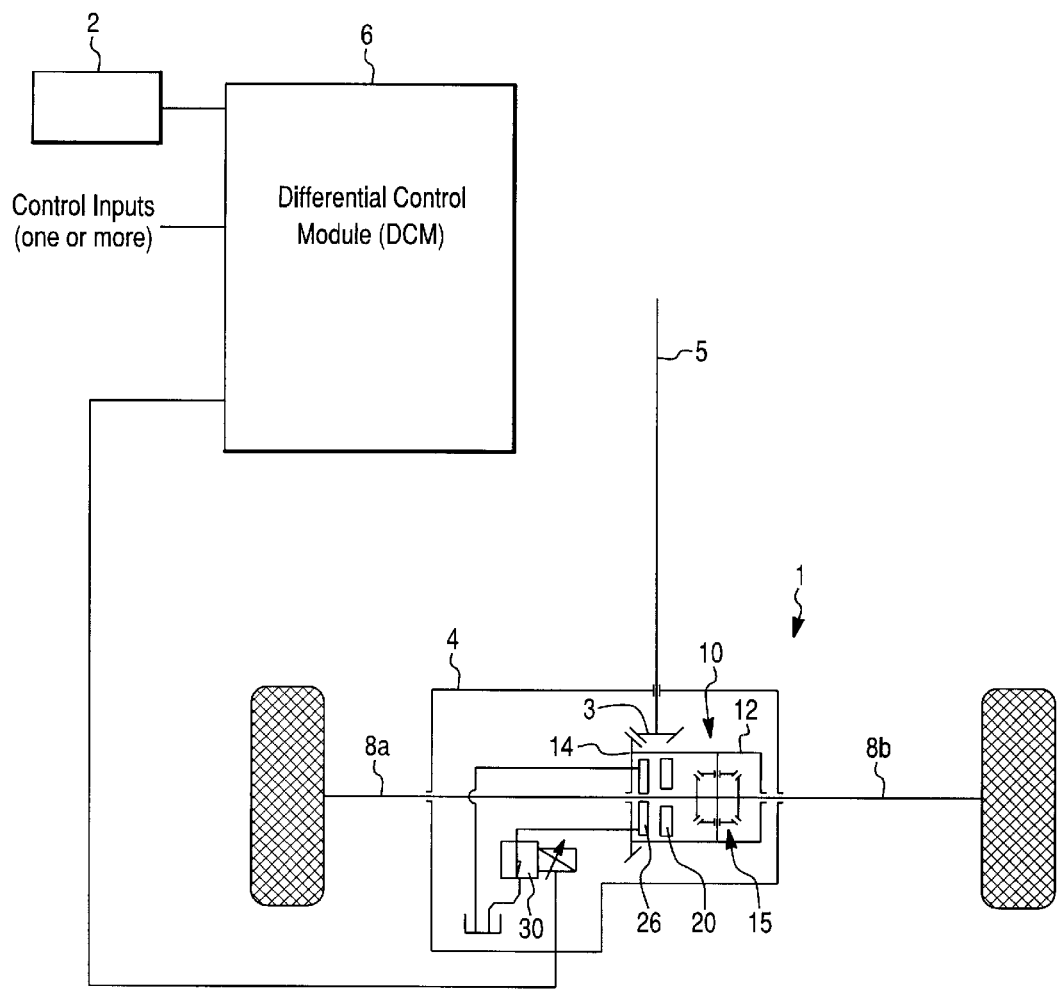
FIG. 1 is a schematic diagram showing a rear axle assembly of a motor vehicle including an electronically controlled limited slip differential assembly.

The preferred embodiment of the present invention will now be described with the reference to accompanying drawings. FIG. 1 schematically depicts a vehicle drive axle assembly 1 including a selectively operable limited slip differential (LSD) assembly 10. However, it is to be understood that while the present invention is described in relation to a speed sensitive limited slip differential, the present invention is equally suitable for use in other hydraulically actuated friction couplings, such as torque coupling mechanisms for a drive-train utilizing a speed sensitive limited slip device.

The differential assembly 10 comprises a rotatable differential case 12 rotatably supported within an axle housing 4 and driven by a drive pinion gear 3 transmitting a drive torque from an engine (not shown) to a ring gear 14 through a propeller shaft 5. A differential gear mechanism 15 disposed within the differential case 12 is operatively coupled to output axle shafts 8a and 8b for allowing differential rotation thereof. The LSD assembly 10 further includes a limited slip device in the form of a hydraulically actuated friction clutch assembly including a friction clutch pack 20 that, when engaged, limits the differential speed between output axle shafts 8a and 8b, a speed sensitive hydraulic displacement pump 26 providing a pressurized hydraulic fluid for actuating the clutch pack 20, and a variable pressure relief valve assembly 30 for selectively controlling a discharge pressure of the pump 26 and, subsequently, the clutch pack 20. The variable pressure relief valve assembly 30 is in the form of a solenoid-operated valve assembly electronically controlled by a differential control module (DCM) 6 based on data from various inputs, such as vehicle wheel sensors. When energized, solenoid-operated valve assembly 30 is capable of modulating a pump discharge pressure in a variable range from a minimum pressure to a maximum pressure, thereby variably controlling a drive torque distribution between the output axle shafts 8a and 8b in a range from a minimum torque value to a maximum torque value. The DCM 6 is also connected to a source of an electric power supply, such as an electric storage battery 2 mounted on the motor vehicle.

Figure 2:
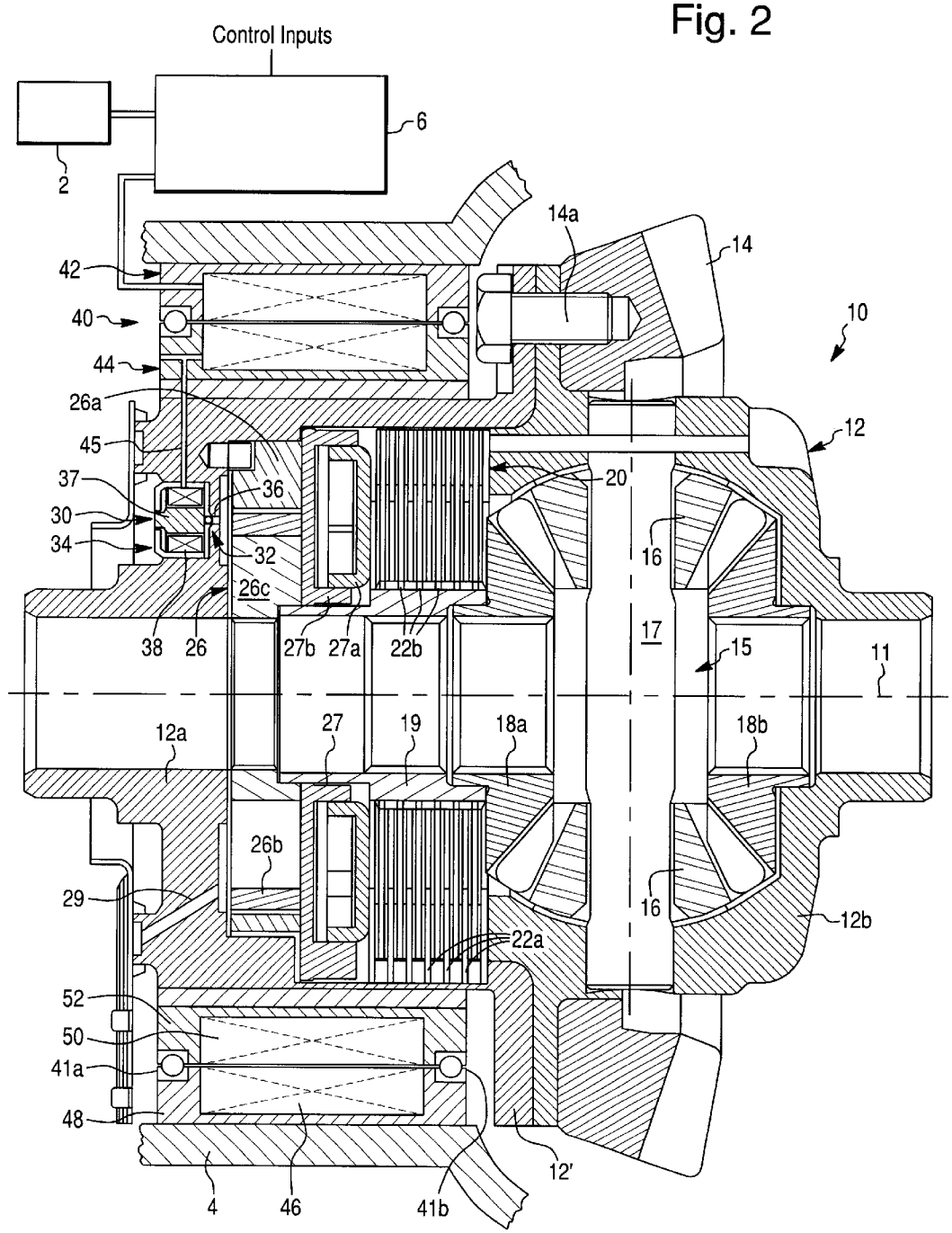
FIG. 2 is a sectional view of the electronically controlled limited slip differential assembly in accordance with the present invention.

FIG. 2 of the drawings illustrates in detail the preferred arrangement of the differential assembly 10 in accordance with the present invention. Reference numeral 12 defines the differential case rotatably supported in the axle housing 4 (shown in FIG. 1) through roller bearings (not shown), and defines an axis of rotation 11. The differential case 12 is made of two half members 12a and 12b fastened to each other, preferably by means of bolts 14a. The ring gear 14 is bolted or other wise secured to the differential case 12 at flange 12'. The differential gear mechanism 15 disposed within the differential case 12 includes a set of pinion gears 16 rotatably supported on a pinion shaft 17 secured to the differential case 12. The pinion gears 16 engage a pair of opposite side gears 18a and 18b adapted to rotate about the axis 11. The side gears 18a and 18b are splined to the output axle shafts 8a and 8b respectively. Disposed adjacent the side gear 18a is an inner clutch sleeve 19 having external splines and drivingly coupled to the associated axle shaft 8a.

The friction clutch pack 20 of the limited slip device is provided within the differential case 12. The friction clutch pack 20, well known in the prior art, includes sets of alternating outer friction plates 22a and inner friction plates 22b. Conventionally, an outer circumference of the outer friction plates 22a is provided with projections that non-rotatably engages corresponding grooves formed in the differential case 12. Similarly, an inner circumference of the inner friction plates 22b is provided with projections that non-rotatably engage corresponding grooves formed in the clutch sleeve 19, which in turn is splined to the associated axle shaft 8a. At the same time, both the outer friction plates 22a and the inner friction plates 22b are slideable in the axial direction. The outer friction plates 22a frictionally engage the inner friction plates 22b to form a torque coupling arrangement between the differential case 12 and the differential mechanism 15 formed by the pinion gears 16 and side gears 18a, 18b. Torque is transferred from a ring gear 14 to the differential case 12, which drives the differential mechanism 15 through the pinion shaft 17.

The clutch pack 20 is selectively actuated by a hydraulic clutch actuator including the speed sensitive hydraulic displacement pump 26, and a piston assembly 27 for axially loading the clutch pack 20.

The speed sensitive hydraulic displacement pump 26 disposed within the differential case 12 actuates the clutch pack 20 when the relative rotation between the output axle shafts 8a and 8b occurs. It will be appreciated that a hydraulic pressure generated by the pump 26 is substantially proportional to a rotational speed difference between the output axle shafts 8a and 8b. Preferably, the hydraulic displacement pump 26 employed to provide pressurized hydraulic fluid to actuate the clutch pack 20 is a gerotor pump. The gerotor pump 26 includes an outer ring member 26a, an outer rotor 26b, and an inner rotor 26c. The inner rotor 26c drivingly coupled to the output axle shaft 8a, and the outer ring member 26a is secured to the differential case 12. The inner rotor 26c has one less tooth than the outer rotor 26b and when the inner rotor 26c is driven, it will drive the outer rotor 26b, which can freely rotate within the outer ring member 26a eccentrically with respect to the inner rotor 26c, thus providing a series of decreasing and increasing volume fluid pockets by means of which fluid pressure is created. Therefore, when relative motion takes place between differential case 12 and the output axle shaft 8a, the inner rotor 26c of the gerotor pump 26 generates hydraulic fluid pressure. However, it will be appreciated that any other appropriate type of hydraulic pump generating the hydraulic pressure in response to the relative rotation between the differential case 12 and the output axle shaft 8a is within the scope of the present invention.

The piston assembly 27 includes a hydraulically actuated piston 27a disposed within a piston housing 27b serves to compress the clutch pack 20 and retard any speed differential between the side gear 18a and the differential case 12. This results in a retardation of any speed differential between the axle shafts 8a and 8b. Pressurized hydraulic fluid to actuate the piston 27a and engage the clutch pack 20 is provided by the gerotor pump 26. In such an arrangement, when a speed difference between the output shafts 8a, 8b exists, the hydraulic fluid is drawn into the pump 26 through a suction passage 29. The gerotor pump 26 pumps the pressurized fluid into a piston pressure chamber 27c defined between the piston 27a and the piston housing 27b to actuate the clutch pack 20. As the speed difference increases, the pressure increases. The pressurized fluid in the piston pressure chamber 27c creates an axial force upon the piston 27a for loading the clutch pack 20, which is further resisted by the friction plates 22a and 22b. The loading of the clutch pack 20 allows for a torque transfer distribution between the axle shafts 8a and 8b.

Figure 3:
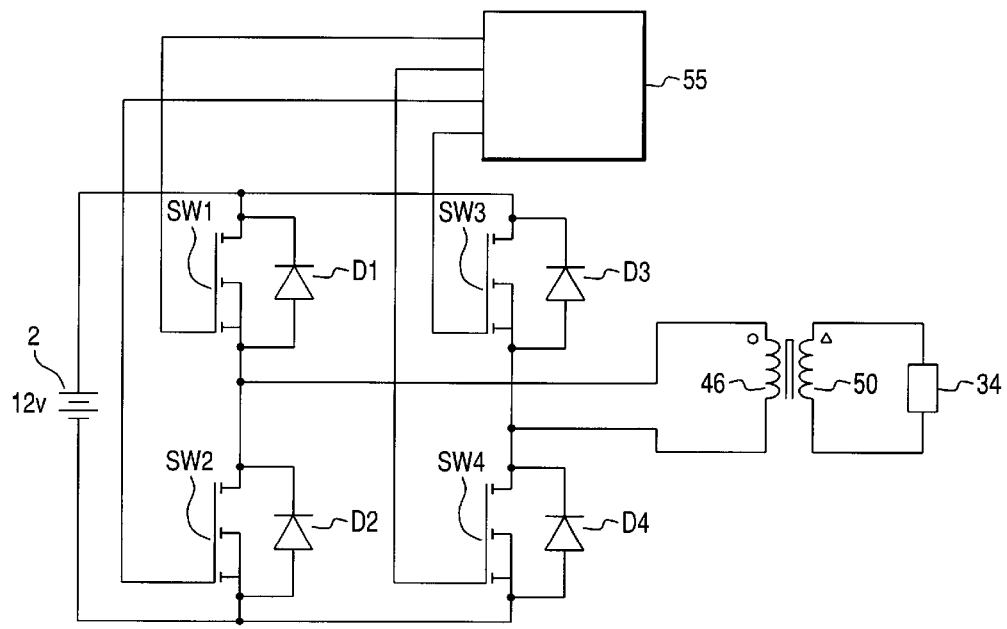
FIG. 3 is a schematic diagram of an electric circuit representing an exemplary embodiment of the present invention.

In order to control the fluid pressure in the piston pressure chamber 27c and, subsequently, the output torque distribution of the limited slip differential assembly, the variable pressure relief valve assembly 30 is provided. The variable pressure relief valve assembly 30 according to the present invention, illustrated in detail in FIG. 3, is in the form of an electromagnetic valve assembly and comprises a pressure relief check valve 32 controlled by an electromagnetic actuator in the form of an solenoid actuator 34. The check valve 32 comprises a fluid relief passageway 36 that is in fluid communication with the piston pressure chamber 27c, a valve seat that is in open communication with the passageway 36, and a valve closure member adapted to seat in the valve seat for sealing the fluid relief passageway 36. It will be appreciated that the valve closure member may be in any appropriate form, such as spherical, conical, etc. The valve seat is formed in the half member 12a of the differential case 12. The valve closure member of the pressure relief check valve 32 is held in place by an armature 37 of the solenoid actuator 34, which holds the valve member against the valve seat. The armature 37 of the solenoid actuator 34 is disposed within a corresponding coil winding 38 thereof.

When electrical current is supplied to the coil winding 38 of the solenoid actuator 34, a magnetic flux is caused to flow through the armature 37. The magnetic flux creates an axial force that axially displaces the armature 37 within the coil winding 38. In response, the armature 37 urges the valve closure member of the pressure relief check valve 32 upon the valve seat thereof with a predetermined retaining force that is a function of the electrical current supplied to the coil winding 38. Such an arrangement creates a relief valve with a release pressure that is a function of the current supplied to the coil winding 38.

The pressurized hydraulic fluid will not flow through the pressure relief valve 32 until the hydraulic pressure results in a reaction force larger than the retaining force exerted to the armature 37 by the magnetic flux generated by the coil winding 38, thereby pushing the valve closure member out of the valve seat. This configuration provides a predetermined pressure limit in the hydraulic system. When a maximum current is applied to the coil winding 38 of the solenoid actuator 34, the retaining force of the pressure relief valve 32 is at its maximum, thus a maximum release pressure is provided by the relief valve 32. In this configuration, the maximum pressure attainable within the case 12 is sufficient to fully actuate the hydraulic clutch pack 20 which results in providing the limited slip function in the differential 10, and the limited slip feature is in the fully "ON" condition.

The pressure limit of the pressure relief valve 32, i.e. the release pressure of the relief valve 32, can be adjusted by controlling the current is applied to the coil winding 38 of the solenoid actuator 34.

As the less current is applied to the coil winding 38, the less retaining force is exerted to the relief valve 32, thus the less is the release pressure provided by the relief valve 32. This results in an adjustment mechanism for lowering the maximum system pressure attainable within the case 12.

When a minimum current is applied to the coil winding 38 of the solenoid actuator 34, the retaining force of the pressure relief valve 32 is at its minimum, thus a minimum release pressure is provided by the relief valve 32. In this configuration, the limited slip feature is in the fully "OFF" condition in that the maximum pressure which can be obtained in the differential case 12 is not high enough to engage the clutch pack 20, essentially disabling the limited slip feature of the hydraulic limited slip differential 10 without affecting the differential capability.

In between the "ON" and "OFF" conditions of the limited slip differential 10 the release pressure of the relief valve 32 may be set at any value these limits by modulating the current applied to the to the coil winding 38 of the solenoid actuator 34. This provides the hydraulic limited slip differential 10 with a variable maximum pressure limit in which the amount of the limited slip available to the differential assembly 10 can be limited and optimized to match various vehicle operating conditions. This provides an opportunity to dynamically control the hydraulic pressure for traction enhancement. For example, if the release pressure is set at a low value, a control system can be used to sense wheel speeds or speed differences and allow for increased hydraulic pressure. The increase in pressure available may be a function of the speed difference. This will result in an optimized amount of limited slip between the fully "ON" and "OFF" conditions.

In order to provide the solenoid actuator 34 of the variable pressure relief valve assembly 30 with an electrical power and/or control signals from the differential control module 6, the limited slip differential 10 of the present invention further includes a transformer assembly 40. As illustrated in FIG. 2, the transformer assembly 40 includes a non-rotatable primary transformer unit 42, and a rotatable secondary transformer unit 44 adjacent to the primary transformer unit 42 in a radially spaced relationship so that the secondary transformer unit 44 is responsive to a magnetic field generated by the primary transformer unit 42 to induce the electrical current to the secondary transformer unit 44 for supplying the electrical current to the solenoid actuator 34 via conductors 45. The primary transformer unit 42 is non-rotatably mounted outside the differential case, preferably to an interior surface of the axle housing 4. The secondary transformer unit 44 is secured to an outer peripheral surface of the half members 12a of the differential case 12. The primary transformer unit 42 includes a primary coil 46 wound about a substantially annular primary core 48. The primary core 48 is non-rotatably secured to the interior surface of the axle housing 4, i.e. secured against rotation relative thereto, by any appropriate means known in the art, such as spline connection, adhesive bonding, indexing key, etc. Similarly, the secondary transformer unit 44 includes a secondary coil 50 wound about a substantially annular secondary core 52. The secondary core 52 is secured to the outer peripheral surface of the half members 12a of the differential case 12 by any appropriate means known in the art, such as adhesive bonding, indexing key, spline connection, etc. The transformer assembly further comprises a bearing assembly including two annular antifriction bearings, such as ball bearings 41a and 41b providing a necessary air gap between the primary and secondary transformer unit 42 and 44, and aligning them in an axial direction.

Figure 4:
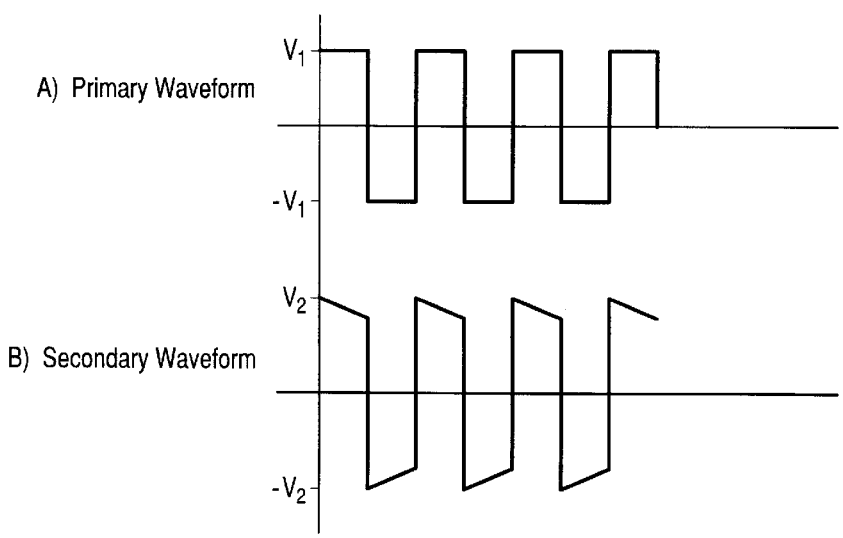
FIG. 4 shows primary and secondary waveforms of a transformer assembly of the exemplary embodiment of the present invention.

FIG. 3 depicts a schematic diagram of an electric circuit representing an exemplary embodiment of the present invention. The electric circuit of FIG. 3 includes four switches SW1, SW2, SW3 and SW4 and a drive circuit 55 adapted for providing the primary coil 46 with an AC primary signal. Preferably, the primary signal has frequency of 60Hz. Those skilled in the art will appreciate that the frequency of the primary signal may be other than 60 Hz. The switches SW1 and SW4 are both simultaneously opened or closed, while switches SW2 and SW3 are both simultaneously closed or opened at 60 Hz rate to provide a primary wave form shown in FIG. 4. Diodes D1, D2, D3 and D4 are used to discharge the current quickly when the switches SW1, SW2, SW3 and SW4 open. The drive circuit provides the switches turn on voltages at and for appropriate time to provide the 60 Hz primary signal. In response to the primary signal, a secondary signal is generated in the secondary coil 50 having a secondary waveform as shown in FIG. 4. By modulating the primary signal, the secondary signal may be modulated, thus variably controlling the solenoid actuator 34. When all drive signals are inhibited, the solenoid actuator 34 is not excited.

Therefore, the electronically controlled differential assembly in accordance with the present invention represents a novel arrangement of the limited slip differential assembly provided with a solenoid actuator for activating a variable pressure relief valve and a transformer assembly for providing the solenoid actuator with an electrical power and/or control signals.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A differential assembly for a motor vehicle, said differential assembly comprising:
   a differential case to be rotated by an outside drive torque;
   at least one output shaft drivingly connected to said differential case;
   a friction clutch assembly for selectively engaging and disengaging said differential case and said output shaft;
   a hydraulic clutch actuator for selectively frictionally loading said clutch assembly, said actuator including a variable pressure relief valve assembly for selectively controlling said friction clutch assembly, said variable pressure relief valve assembly including:
      an electro-magnetic actuator;
      a pressure relief valve selectively controlled by said electro-magnetic actuator; and
   a transformer assembly for supplying an electrical current to said electro-magnetic actuator, said transformer assembly including a non-rotatable primary transformer unit and a rotatable secondary transformer unit, said primary transformer unit being stationarily mounted outside said differential case and connected to a source of electrical energy, said secondary transformer unit being mounted to said differential case, said secondary transformer unit being responsive to a magnetic field generated by said primary transformer unit to induce said electrical current to said secondary transformer unit for supplying said electrical current to said electro-magnetic actuator.

2. The differential assembly as defined in claim 1, wherein said secondary transformer unit is non-rotatably secured to an outer peripheral surface of said differential case.

3. The differential assembly as defined in claim 1, further including an axle housing rotatably supporting said differential case therewithin, wherein said primary transformer unit is non-rotatably secured to an interior surface of said axle housing.

4. The differential assembly as defined in claim 1, wherein said primary transformer unit includes a substantially annular primary coil and said secondary transformer unit includes a substantially annular secondary coil positioned adjacent to said primary coil.

5. The differential assembly as defined in claim 4, wherein said primary coil is wound about a primary core and said secondary coil is wound about a secondary core, and wherein said secondary core is non-rotatably secured to an outer peripheral surface of said differential case.

6. The differential assembly as defined in claim 5, further including an axle housing rotatably supporting said differential case therewithin, wherein said primary core is non-rotatably secured to an interior surface of said axle housing.

7. The differential assembly as defined in claim 5, further including two antifriction bearings for providing an air gap between said primary transformer unit and said secondary transformer unit and aligning them in an axial direction, each of said antifriction bearings is disposed between said primary core and said secondary core.

8. The differential assembly as defined in claim 1, further including an antifriction bearing assembly for providing an air gap between said primary transformer unit and said secondary transformer unit and aligning them in an axial direction.

9. The differential assembly as defined in claim 8, wherein said antifriction bearing assembly includes two axially spaced antifriction bearings each disposed between said primary transformer unit and said secondary transformer unit.

10. The differential assembly as defined in claim 9, wherein said antifriction bearings are ball bearings.

11. The differential assembly as defined in claim 1, wherein said hydraulic clutch actuator further including a hydraulic pump for generating a hydraulic pressure to frictionally load said clutch assembly and a piston assembly disposed within said differential case between said pump and said clutch pack and defining a pressure chamber, wherein said variable pressure relief valve assembly selectively controls a maximum pressure within said pressure chamber.

12. The differential assembly as defined in claim 11, wherein said hydraulic pump is disposed within said differential case and generates a hydraulic pressure in response to relative rotation between said differential case and said at least one output shaft.

13. The differential assembly as defined in claim 11, wherein said pump is a gerotor pump.

14. The differential assembly as defined in claim 11, wherein said variable pressure relief valve assembly is provided to selectively set a maximum hydraulic pressure attainable within said pressure chamber between a maximum release pressure and a minimum release pressure.

15. The differential assembly as defined in claim 1, wherein said friction clutch assembly is a friction clutch pack including at least one inner friction plate coupled to rotate with said at least one output shaft and at least one outer friction plate coupled to rotate with said differential case, said friction plates being frictionally engageable with one another.

16. The differential assembly as defined in claim 1, wherein said electro-magnetic actuator is a solenoid including an armature movable within a coil winding.

17. The differential assembly as defined in claim 1, wherein said variable pressure relief valve assembly is provided to selectively set a maximum hydraulic pressure attainable within said differential case between a maximum release pressure and a minimum release pressure.

18. A limited slip differential assembly for a motor vehicle, said differential assembly comprising:

a differential case rotatably supported within an axle housing;

two axially opposite output shafts drivingly connected to said differential case through a differential gear mechanism;

a friction clutch pack for selectively engaging and disengaging said case and one of said output shafts, said clutch pack comprising a plurality of inner friction plates coupled to rotate with said at least one output shaft and a plurality of outer friction plates coupled to rotate with said differential case; and a hydraulic clutch actuator for selectively frictionally loading said clutch pack, said actuator comprising:

a hydraulic pump for generating a hydraulic pressure;

a piston assembly disposed within said differential case between said pump and said clutch pack and defining a pressure chamber; and a variable pressure relief valve assembly to selectively control said limited slip assembly, said variable pressure relief valve assembly including a pressure relief valve and a solenoid actuator for selectively setting a maximum hydraulic pressure attainable within said pressure chamber between a maximum release pressure and a minimum release pressure; and a transformer assembly for supplying an electrical current to said electro-magnetic actuator, said transformer assembly including a non-rotatable primary transformer unit, a rotatable secondary transformer unit and two axially spaced antifriction bearings each disposed between said primary transformer unit and said secondary transformer unit for providing an air gap therebetween and aligning them in an axial direction;

said primary transformer unit including a substantially annular primary coil wound about a primary core and connected to a source of electrical energy, said primary core is non-rotatably secured to an interior surface of said axle housing;

said secondary transformer unit including a substantially annular secondary coil wound about a secondary core and positioned adjacent to said primary coil, said secondary core is secured to an outer peripheral surface of said differential case;

wherein said secondary transformer unit being responsive to a magnetic field generated by said primary transformer unit to induce said electrical current to said secondary transformer unit for supplying said electrical current to said solenoid actuator.

* * * * *